United States Patent
Higgins et al.

(10) Patent No.: US 8,478,597 B2
(45) Date of Patent: *Jul. 2, 2013

(54) METHOD AND SYSTEM FOR ASSESSING PRONUNCIATION DIFFICULTIES OF NON-NATIVE SPEAKERS

(75) Inventors: Derrick Higgins, Highland Park, NJ (US); Klaus Zechner, Princeton, NJ (US); Yoko Futagi, Lawrenceville, NJ (US); Rene Lawless, Pennington, NJ (US)

(73) Assignee: Educational Testing Service, Princeton, NJ (US)

( * ) Notice: Subject to any disclaimer, the term of this patent is extended or adjusted under 35 U.S.C. 154(b) by 1393 days.

This patent is subject to a terminal disclaimer.

(21) Appl. No.: 11/328,651

(22) Filed: Jan. 10, 2006

(65) Prior Publication Data

US 2006/0155538 A1    Jul. 13, 2006

Related U.S. Application Data

(60) Provisional application No. 60/643,131, filed on Jan. 11, 2005.

(51) Int. Cl.
| G06F 17/27 | (2006.01) |
| G10L 17/00 | (2006.01) |
| G10L 15/04 | (2006.01) |
| G10L 15/18 | (2006.01) |
| G10L 13/00 | (2006.01) |
| G10L 13/08 | (2006.01) |
| G10L 21/06 | (2006.01) |
| G10L 21/00 | (2006.01) |

(52) U.S. Cl.
USPC ............... 704/270; 704/9; 704/2; 704/246; 704/251; 704/260; 704/271; 704/272; 704/254; 704/258

(58) Field of Classification Search
USPC ............... 704/270, 271, 272, 251, 246, 258, 704/260, 9, 257; 434/327, 167, 185
See application file for complete search history.

(56) References Cited

U.S. PATENT DOCUMENTS

| 5,271,088 A | * | 12/1993 | Bahler ........................ 704/200 |
| 5,857,173 A | * | 1/1999 | Beard et al. .................. 704/276 |
| 5,920,838 A | * | 7/1999 | Mostow et al. ............... 704/255 |
| 6,016,471 A |   | 1/2000 | Kuhn et al. |
| 6,055,498 A | * | 4/2000 | Neumeyer et al. ............ 704/246 |
| RE37,684 E | * | 4/2002 | Shpiro et al. .................. 434/185 |

(Continued)

OTHER PUBLICATIONS

H. Franco et al., "The SRI EduSpeak system: Recognition and pronunciation scoring for language learning", Proc. of InSTIL, Scotland, 123-128, 2000. http://citeseer.ist.psu.edu/franco00sri.html.*

(Continued)

*Primary Examiner* — Paras D Shah
(74) *Attorney, Agent, or Firm* — Jones Day

(57) ABSTRACT

The present disclosure presents a useful metric for assessing the relative difficulty which non-native speakers face in pronouncing a given utterance and a method and systems for using such a metric in the evaluation and assessment of the utterances of non-native speakers. In an embodiment, the metric may be based on both known sources of difficulty for language learners and a corpus-based measure of cross-language sound differences. The method may be applied to speakers who primarily speak a first language speaking utterances in any non-native second language.

30 Claims, 3 Drawing Sheets

U.S. PATENT DOCUMENTS

| | | | |
|---|---|---|---|
| 6,397,185 B1* | 5/2002 | Komissarchik et al. | 704/270 |
| 6,711,544 B2* | 3/2004 | Spiser-Albert et al. | 704/271 |
| 6,725,198 B2* | 4/2004 | Waryas et al. | 434/185 |
| 6,732,544 B1* | 5/2004 | Taraboletti et al. | 62/642 |
| 7,062,441 B1* | 6/2006 | Townshend | 704/270 |
| 7,124,082 B2 | 10/2006 | Freedman | |
| 7,219,059 B2* | 5/2007 | Gupta et al. | 704/240 |
| 7,260,531 B2* | 8/2007 | Kosaka et al. | 704/255 |
| 7,299,188 B2* | 11/2007 | Gupta et al. | 704/276 |
| 7,302,389 B2* | 11/2007 | Gupta et al. | 704/235 |
| 7,392,187 B2 | 6/2008 | Bejar et al. | |
| 7,401,018 B2* | 7/2008 | Yamada et al. | 704/251 |
| 2004/0176960 A1* | 9/2004 | Shpiro et al. | 704/277 |
| 2004/0215445 A1* | 10/2004 | Kojima | 704/9 |
| 2005/0089828 A1* | 4/2005 | Ayaz | 434/157 |
| 2006/0020462 A1* | 1/2006 | Reich | 704/254 |
| 2008/0294440 A1 | 11/2008 | Higgins et al. | |

OTHER PUBLICATIONS

Oppelstrup, L. et al. "Scoring Children's Foreign Language Pronunciation." Proceedings, FONETIK 2005. pp. 51-54.*

Herron, D., Menzel W., Atwell E., Bisiani R., Daneluzzi F., Morton R., Schmidt J. A. (1999) Automatic localization and diagnosis of pronunciation errors for second-language learners of English, Proc. 6 th European Conference on Speech Communication and Technology, Eurospeech 99, Budapest, pp. 855-858.*

O. Ronen, L. Neumeyer, and H. Franco, "AutomaticDetection of Mispronunciation for LanguageInstruction", Proc. of Eurospeech 97, Rhodes, Greece,1997.*

Witt, S., & Young, S. (1998). Computer-Assisted pronunciation teaching based on automatic speech recognition. In Jager, S., Nerbonne, J., & van Essen, A. (Eds.), Language Teaching & Language Technology, Lisse, The Netherlands: Swets & Zeitlinger, 25-35.*

Dalby, J., & Kewley-Port, D. (1999). Explicit pronunciation training using automatic speech recognition. CALICO Journal, 16 (3), 425-446.*

Bada, Erdogan. 2001. Native language influence on the production of English sounds by Japanese learners. Reading Matrix: An International Online Journal 1, No. 2 (September).*

Kota Ohata. Phonological Differences between Japanese and English: Several Potentially Problematic Areas of Pronunciation for Japanese ESL/EFL Learners. Dec. 2004, vol. 6, issue, 4, Asian EFL Journal.*

G. Deville and O. Deroo and S. Gielen and H. Leich and J. Van Parys, Automatic Detection and Correction of Pronunciation Errors for Foreign Language Learners : The DEMOSTHENES Application, Proceedings of the European Conference on Speech Communication and Technology, 1999, pp. 843-846.*

Weinrich, Languages in Contact: Findings and Problems, Mouton & Co., N.V., The Hague, 1974 (TOC).

Odlin, Language Transfer: Cross-linguistic influence in language learning, Cambridge University Press, Cambridge, 1989 (TOC).

Selinker, Rediscovering Interlanguage, Longman, London, 1992 (TOC).

Avery et al., Teaching American English Pronunciation, Oxford Univ. Press, 1992 (TOC).

Celce-Murcia et al., Teaching Pronunciation: A Reference for Teachers of English to Speakers of Other Languages, Cambridge University Press, 1996 (TOC).

Carlisle, The Influence of Environment on Vowel Epenthesis in Spanish/English Interphonology, 1991, Appl. Lingusitics 12(1):76-95.

Katz et al., SourceFinder: Course preparation via linguistically targeted web search, 2001, Educ. Tech. & Soc. 4(3):45-49.

Marcus et al., Building a Large Annotated Corpus of English: The Penn Treebank, 1993, Comp. Ling. 19(2):313-330.

International Application of PCT Application No. PCT/US2006/000646, Dec. 26, 2007, 4 pages.

Tomokiyo, L.-M.: Recognizing Non-Native Speech: Characterizing and Adapting to Non-Native Usage in LVCSR, PhD Thesis, Carnegie Mellon University, 2001.

Bouwman, Gies / Cranen, Bert / Boves, Lou (2004): "Predicting word correct rate from acoustic and linguistic confusability", In INTERSPEECH-2004, 1481-1484.

International Search Report dated Dec. 26, 2007 from corresponding International Application No. PCT/US2006/000646.

Written Opinion of the International Searching Authority dated Dec. 26, 2007 from corresponding International Application No. PCT/US2006/000646.

* cited by examiner

| Description | Source | Weight |
| --- | --- | --- |
| The sound /r/ (does not contrast with /l/ in Japanese) | /r/ | 1 |
| The sound /l/ (does not contrast with /r/ in Japanese) | /l/ | 1 |
| The sound /θ/ (does not exist in Japanese) | /θ/ | 1 |
| The sound /ð/ (does not exist in Japanese) | /ð/ | 1 |
| Voiceless stops (Shorter VOT in Japanese) | /p/, /t/, or /k/ | 0.2 |
| Non-sonorant coda consonant (Japanese syllables are open, or closed only by a nasal) | $/C^{[-sonorant]}]_\sigma/$ | 5 |
| Complex syllable onset (Japanese does not allow consonant clusters | $/[_\sigma CC+/$ | 5 |

FIG. 2

METHOD AND SYSTEM FOR ASSESSING PRONUNCIATION DIFFICULTIES OF NON-NATIVE SPEAKERS

CROSS-REFERENCE TO RELATED APPLICATION

This patent application claims priority to, and incorporates by reference in its entirety, U.S. Provisional Patent Application No. 60/643,131, entitled "Method and System for Assessing Pronunciation Difficulties of Non-Native Speakers" and filed Jan. 11, 2005.

TECHNICAL FIELD

The present invention relates generally to the field of speech recognition and assessment. The present invention particularly relates to a method and system for quantifying the relative pronunciation difficulty that an utterance in a second language poses for a non-native speaker.

BACKGROUND

Much literature exists on the specific aspects of native language sound structure that are difficult for non-native speakers, and to what extent features of a native language may interfere with learning correct pronunciation in a second language. This work is rooted in Uriel Weinreich's notion of interference and is developed in more recent works into Terence Odlin's and Larry Selinker's concepts of language transfer and interlanguage. "*Languages in Contact*," Uriel Weinreich, (1968); "*Language Transfer*," Terence Odlin, (1989); "*Rediscovering Interlanguage*," Larry Selinker, (1992). From the pedagogical side, Avery and Ehrlich's "*Teaching America English Pronunciation*" and Celce—Murcia et al's "*Teaching Pronunciation*" are two reference materials which provide insight into the structure of English phonology and phonetic's, the implications it has for the learning of pronunciation, and how it interacts with a speakers' linguistic backgrounds. "*Teaching American English Pronunciation*," Peter Avery and Susan Ehrlich, (1992); "*Teaching Pronunciation*," Marianne Celce—Murcia, Donna M Brinton, and Janet M Goodwin, (1996). However, none of the literature quantifies the difficulty that a non-native speaker of a particular non-native language background would have in pronouncing a given utterance of the native language.

The present invention is directed to solving one or more of the above-listed problems.

SUMMARY

In an embodiment, a method of assessing the pronunciation difficulties of a non-native speaker may include determining one or more sources of the pronunciation difficulties between a language of the non-native speaker and a second language, assigning a weight to each source, calculating a phonetic difficulty score based on the one or more sources and the weight assigned to each source, calculating a language model score based on a sound comparison between the language of the non-native speaker and the second language, normalizing the phonetic difficulty score and the language model score, and calculating a metric by calculating the sum of the normalized phonetic difficulty score and the normalized language model score.

In an embodiment, calculating the phonetic difficulty score may include calculating a product of the number of times the source occurs in the language of the non-native speaker and the weight of the source. Calculating the language model score may include calculating a language model for the language of the non-native speaker and the second language and calculating a cross-entropy of an utterance with respect to the language model of the non-native speaker's first language inversely weighted by the cross-entropy of the utterance with respect to the language model of the second language. A language model may be calculated by phonetically transcribing the language of the non-native speaker and the second language. The cross-entropy of an utterance with respect to the language model of the non-native speaker may be calculated by assigning a lower score to utterances of the second language that are similar to sounds of the first language and assigning a higher score to utterances of the second language that are not similar to sounds of the first language. A normalization equation may be used to normalize the phonetic difficulty score and the language model score. The normalized phonetic difficulty score and the normalized language model score may have the same mean and standard deviation once each has been normalized.

In an embodiment, a system may include a processor, a processor-readable storage medium in communication with the processor, and a display. The system may be used to assess the pronunciation difficulties of a non-native speaker. The processor-readable storage medium may contain one or more programming instructions for performing the method of assessing the pronunciation difficulties of a non-native speaker.

BRIEF DESCRIPTION OF THE DRAWINGS

Aspects, features, benefits, and advantages of the embodiments of the present invention will be apparent with regard to the following description, appended claims, and accompanying drawings where:

FIG. 2 lists exemplary sources of difficulty that a native speaker of Japanese may have when speaking English.

DETAILED DESCRIPTION

Before the present methods, systems, and materials are described, it is to be understood that this invention is not limited to the particular methodologies, systems, and materials described, as these may vary. It is also to be understood that the terminology used in the description is for the purpose of describing the particular versions or embodiments only, and is not intended to limit the scope of the invention, which will be limited only by the appended claims.

It must also be noted that as used herein and in the appended claims, the singular forms "a," "an," and "the" include plural references unless the context clearly dictates otherwise. Thus, for example, reference to a "source" is a reference to one or more sources and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

Figure 1:
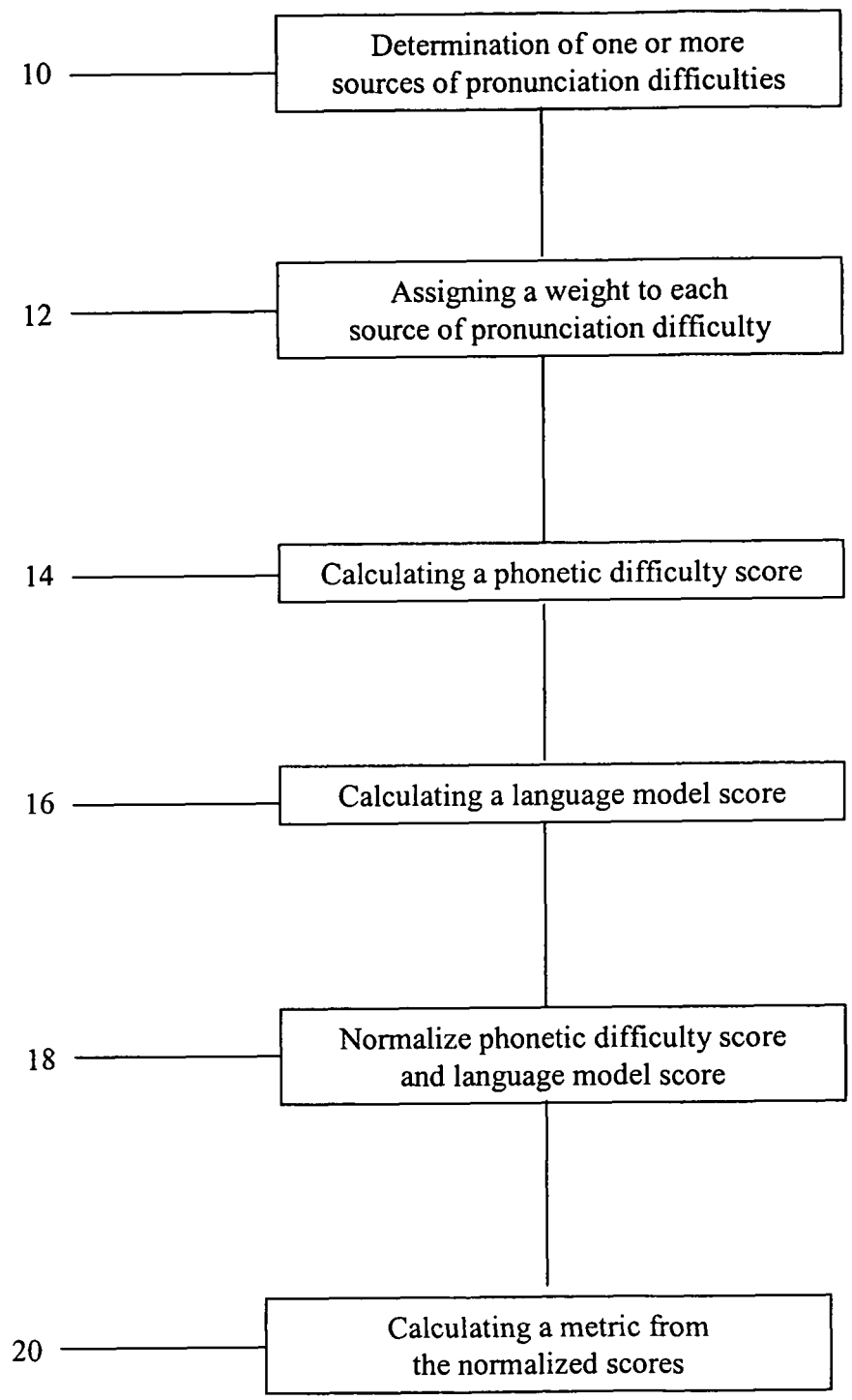
FIG. 1 depicts an exemplary method of assessing pronunciation difficulties for non-native speakers according to an embodiment.

FIG. 1 shows an exemplary method of assessing pronunciation difficulties for non-native speakers. A determination of one or more sources of the pronunciation difficulties between a language of the non-native speaker and a second language, as represented by 10, may be made by reviewing studies from language pedagogy, phonetics, and interlanguage phonology, or may be based on an observation of learner tendencies. These sources of difficulty may include, without limitation, shibboleths, which are well known markers of non-native speakers with specific backgrounds. For example, the well-known tendency of Japanese speakers to have difficulty with the contrastive "r" and "l" sounds in the English language is reported in many studies. Other, less obvious tendencies may be found in the literature, such as the observation that Japanese speakers may have difficulty with English voiceless stops, producing them with a shorter voice-onset time than native speakers of the English language.

Once a determination of one or more of the sources has been made, each source may then be assigned a weight 12 that may be a measure of the severity of the source as reflected in the pedagogical and linguistic literature related to the speaker's background. In addition, the weights may be chosen in consultation with a native speaker of the first language. FIG. 2 lists exemplary sources of difficulty that a native speaker of Japanese may have with the English language. A description of the source is provided along with a symbol that may be used to represent the source. Each source also includes a weight.

After determining the one or more sources and assigning a weight to each source, a phonetic difficulty score may be calculated based on the one or more sources and the weight assigned to each source 14. The formula for the phonetic difficulty score may comprise calculating a product of the number of times the source occurs in an utterance of the non-native speaker and the weight of the source. More explicitly, the phonetic difficulty score may be defined by the following equation:

$$Score_{phonetic\ difficulty} = \sum_{\forall t} Count(t, u) \cdot W(t)$$

where:
t is the phonetic source,
u is the utterance,
W(t) is the weight assigned to the source, and
Count(t,u) is the number of times t appears in u.

The phonetic difficulty score may be tied to actual error types that language learners of a given first language background commit in speaking the second language. Since the existence of a difference between languages does not guarantee interference effects, empirical data may be used to determine whether a particular error type occurs with some frequency. However, the phonetic difficulty score alone may be limited because it may require the advance detection of error types. Moreover, identified errors alone may not determine the relative importance of each source of difficulty.

After calculating the phonetic difficulty score, a language model score may then be calculated based on a sound comparison between the language of the non-native speaker and a second language 16. In an embodiment, calculating the language model score may comprise calculating a language model for the language of the non-native speaker and the second language and calculating a cross-entropy of an utterance with respect to the language model of the non-native speaker's first language inversely weighted by the cross-entropy of the utterance with respect to the language model of the second language. The language model score may be derived from the following equation:

$$D(u, P_{L1}[\cdot] \| P_{L2}[\cdot]) = H(u, P_{L1}[\cdot]) - H(u, P_{L2}[\cdot])$$
$$= -\log\left(\frac{P_{L1}[u]}{P_{L2}[u]}\right)$$

Where:
u is the utterance,
$P_{L1}[\cdot]$ is the distribution defined by the language model of the first language,
$P_{L2}[\cdot]$ is the distribution defined by the language model of the second language,
$H(u, P[\cdot])$ represents the cross entropy of the utterance u with respect to $P[\cdot]$, and
D indicates that the language model score is a form of the KL divergence.

The language model for the language of the non-native speaker and the second language may comprise phonetically transcribing the language of the non-native speaker and the second language. These languages may be phonetically transcribed by applying a phonetic dictionary to the text of a collection of recorded utterances of each language. The cross-entropy of an utterance with respect to the language model of the non-native speaker's first language may be calculated by assigning a lower score to utterances of the second language that are similar to sounds of the first language and assigning a higher score to utterances of the second language that are not similar to sounds of the first language. The cross-entropy may be determined by the following equation:

$$H(u, P_{L1}[\cdot]) = -\log(P_{L1}[u])$$

Similarly, the cross entropy of the utterance with respect to the second language would be calculated as:

$$H(u, P_{L2}[\cdot]) = -\log(P_{L2}[u])$$

Unlike the phonetic difficulty score, the language model may use observed differences between languages and not observed sources of difficulty. The language model score may be based on statistical models of the sound structure of the first and second languages. Given these models, a metric that gives high values to sound patterns that are uncommon in the first language, but relatively common in the second language, may be designed.

After calculating both of the scores, the scores may be normalized 18, so that they make approximately the same contribution to a final difficulty score. The normalized scores may comprise the same mean and standard deviation. Each score may be normalized by using the following normalization equation:

$$Norm(x) =_{def} \frac{x - \overline{X}}{\sigma_x}$$

where:
X represents the distribution of scores
$\overline{X}$ represents the mean of this distribution
$\sigma_x$ represents the standard deviation of this distribution, and
x is a score drawn from this distribution.

Once the scores have been normalized, a metric may be calculated by adding the normalized phonetic difficulty score and a normalized language difficulty score 20. The metric may quantify the pronunciation difficulty that an utterance in a second language poses for non-native speakers of different first language backgrounds. The metric may combine information from a measure of cross-language sound differences and the literature of language pedagogy to produce a single prediction of pronunciation difficulty. The method may be applicable to any pair of languages that could serve as the first and second languages.

Figure 3:
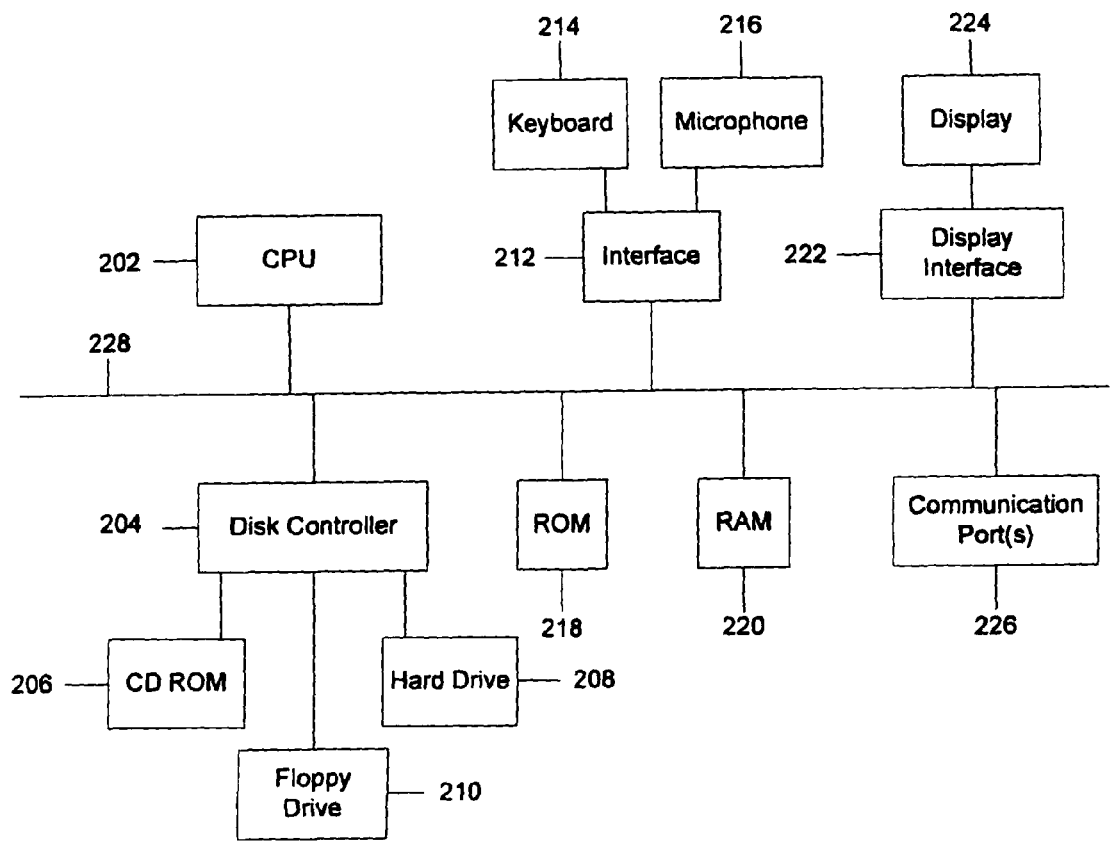
FIG. 3 depicts an exemplary system for assessing pronunciation difficulties according to an embodiment.

FIG. 3 shows a block diagram of exemplary hardware that may be used to contain and/or implement the program instructions of system embodiments of the present invention. A bus 228 may serve as the information highway interconnecting the other illustrated components of the hardware. A processor 202, such as a central processing unit (CPU), may perform calculations and logic operations required to execute a program. A processor-readable storage medium, such as read only memory (ROM) 218 and/or random access memory (RAM) 220, may be in communication with the processor 202 and may contain one or more programming instructions for performing the method of assessing the pronunciation difficulties of a non-native speaker. Optionally, program instructions may be stored on a computer readable carrier such as a digital disk, recordable memory device, or other recording medium, a communications signal, or a carrier wave.

A disk controller 204 interfaces one or more optional disk drives to the system bus 228. These disk drives may be external or internal floppy disk drives such as 210, external or internal CD-ROM, CD-R, CD-RW or DVD drives such as 206, or external or internal hard drives 208. As indicated previously, these various disk drives and disk controllers are optional devices Each of the element managers, real-time data buffers, conveyors, file input processor, database index shared access memory loader, reference data buffer and data managers may include a software application stored in one or more of the disk drives connected to the disk controller 204, the ROM 218 and/or the RAM 220. Preferably, the processor 202 may access each component as required.

A display interface 222 may permit information from the bus 228 to be displayed on a display 224 in audio, graphic, or alphanumeric format. Communication with external devices may optionally occur using various communication ports 226.

In addition to the standard computer-type components, the hardware may also include data input devices, such as a keyboard 214, or other input device 216, such as a microphone, remote control, pointer, mouse and/or joystick.

It is to be understood that the invention is not limited in its application to the details of construction and to the arrangements of the components or steps set forth in this description or illustrated in the drawings. The disclosed method and system are capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the disclosed embodiments.

We claim:

1. A computer-implemented method of assessing pronunciation difficulties of a non-native speaker, the method comprising:

determining a plurality of different types of phonetic sources of pronunciation difficulties between a language of a non-native speaker and a second language, said determining including determining multiple types of sounds in the second language that cause pronunciation difficulties;

assigning a weight to each phonetic source of pronunciation difficulty, the weight representing a measure of severity of the source of pronunciation difficulty;

calculating using a processor a phonetic difficulty score, wherein calculating the phonetic difficulty score comprises calculating a product of a number of times the phonetic source occurs in an utterance of the non-native speaker and the weight of the phonetic source;

calculating using the processor a language model score based on a sound comparison between the language of the non-native speaker and the second language, wherein the language model score is calculated based on a difference between a cross-entropy of the utterance with respect to a language model of the language of the non-native speaker and a cross-entropy of the utterance with respect to a language model of the second language;

normalizing using the processor the phonetic difficulty score and the language model score; and calculating and outputting a metric from the normalized phonetic difficulty score and the normalized language model score, the metric providing an assessment of pronunciation difficulty.

2. The method of claim 1, wherein the phonetic difficulty score is calculated using an equation:

$$\text{Score}_{phonetic\ difficulty} = \sum_{\forall t} \text{Count}(t, u) \cdot W(t),$$

where $\text{Score}_{phonetic\ difficulty}$ is the phonetic difficulty score, t is the phonetic source, u is the utterance, W(t) is the weight of the phonetic source, and Count(t, u) is the number of times the phonetic source occurs in the utterance of the non-native speaker.

3. The method of claim 1, wherein calculating the language model score comprises calculating a language model for the language of the non-native speaker and the second language.

4. The method of claim 3, wherein calculating a language model for the language of the non-native speaker and the second language comprises phonetically transcribing the first language of the non-native speaker and the second language.

5. The method of claim 1, wherein normalizing the phonetic difficulty score and the language model score comprises determining a normalized phonetic difficulty score and a normalized language model score such that the mean of the normalized phonetic difficulty score is equal to the mean of the normalized language model score and the standard deviation of the normalized phonetic difficulty score is equal to the standard deviation of the normalized language model score.

6. The method of claim 1, wherein calculating the metric comprises calculating the sum of the normalized phonetic difficulty score and the normalized language model score.

7. The method of claim 1, wherein the multiple types of sounds in the second language that cause pronunciation difficulties include:
- a first sound that does not contrast with a second sound in the language of the non-native speaker; and
- a third sound that does not exist in language of the non-native speaker.

8. The method of claim 7, wherein the language of the non-native speaker is Japanese, the second language is English, the first sound is the second sound is /l/, and the third sound is /θ/.

9. The method of claim 1, further comprising:
calculating using the processor the language model score based on the sound comparison between the language of the non-native speaker and the second language, including calculating a language model for the language of the non-native speaker and the second language and calculating a cross-entropy of an utterance with respect to the language model of the language of the non-native speaker inversely weighted by the cross-entropy of the utterance with respect to the language model of the second language.

10. The method of claim 9, wherein calculating the cross-entropy of an utterance with respect to the language model of the language of the non-native speaker comprises assigning a lower score to utterances of the second language that are similar to sounds of the language of the non-native speaker, and assigning a higher score to utterances of the second language that are not similar to sounds of the language of the non-native speaker.

11. A system for assessing the pronunciation difficulties of a non-native speaker comprising:
- a processor; and
- a processor-readable storage medium in communication with the processor, wherein the processor-readable storage medium contains one or more programming instructions for causing the processor to perform a method of predicting the pronunciation difficulties of a non-native speaker, the method comprising:
  - determining a plurality of different types of phonetic sources of pronunciation difficulties between a language of a non-native speaker and a second language, said determining including determining multiple types of sounds in the second language that cause pronunciation difficulties;
  - assigning a weight to each phonetic source of pronunciation difficulty, the weight representing a measure of severity of the source of pronunciation difficulty;
  - calculating a phonetic difficulty score, wherein calculating the phonetic difficulty score comprises calculating a product of a number of times the phonetic source occurs in an utterance of the non-native speaker and the weight of the phonetic source;
  - calculating a language model score based on a sound comparison between the language of the non-native speaker and the second language, wherein the language model score is calculated based on a difference between a cross-entropy of the utterance with respect to a language model of the language of the non-native speaker and a cross-entropy of the utterance with respect to a language model of the second language;
  - normalizing the phonetic difficulty score and the language model score; and
  - calculating and outputting a metric from the normalized phonetic difficulty score and the normalized language model score, the metric providing an assessment of pronunciation difficulty.

12. The system of claim 11, wherein the phonetic difficulty score is calculated using an equation:

$$\text{Score}_{phonetic\ difficulty} = \sum_{\forall t} \text{Count}(t, u) \cdot W(t),$$

where $\text{Score}_{phonetic\ difficulty}$ is the phonetic difficulty score, t is the phonetic source, u is the utterance, W(t) is the weight of the phonetic source, and Count(t, u) is the number of times the phonetic source occurs in the utterance of the non-native speaker.

13. The system of claim 11, wherein calculating the language model score comprises calculating a language model for the language of the non-native speaker and the second language.

14. The system of claim 13, wherein calculating a language model for the language of the non-native speaker and the second language comprises phonetically transcribing the language of the non-native speaker and the second language.

15. The system of claim 11, wherein normalizing the phonetic difficulty score and the language model score comprises determining a normalized phonetic difficulty score and a normalized language model score such that the mean of the normalized phonetic difficulty score is equal to the mean of the normalized language model score and the standard deviation of the normalized phonetic difficulty score is equal to the standard deviation of the normalized language model score.

16. The system of claim 11, wherein calculating the metric comprises calculating the sum of the normalized phonetic difficulty score and the normalized language model score.

17. The system of claim 11, wherein the multiple types of sounds in the second language that cause pronunciation difficulties include:
- a first sound that does not contrast with a second sound in the language of the non-native speaker; and
- a third sound that does not exist in language of the non-native speaker.

18. The system of claim 17, wherein the language of the non-native speaker is Japanese, the second language is English, the first sound is /r/, the second sound is /l/, and the third sound is /θ/.

19. The system of claim 11, wherein the method further comprises:
calculating the language model score based on the sound comparison between the language of the non-native speaker and the second language, including calculating a language model for the language of the non-native speaker and the second language and calculating a cross-entropy of an utterance with respect to the language model of the language of the non-native speaker inversely weighted by the cross-entropy of the utterance with respect to the language model of the second language.

20. The system of claim 19, wherein calculating the cross-entropy of an utterance with respect to the language model of the language of the non-native speaker comprises assigning a lower score to utterances of the second language that are similar to sounds of the language of the non-native speaker, and assigning a higher score to utterances of the second language that are not similar to sounds of the language of the non-native speaker.

21. A non-transitory computer-readable storage medium for assessing pronunciation difficulties of a non-native speaker, comprising computer-executable instructions, which when executed cause a processing system to execute steps comprising:
- determining a plurality of different types of phonetic sources of pronunciation difficulties between a language of a non-native speaker and a second language, said determining including determining multiple types of sounds in the second language that cause pronunciation difficulties;
- assigning a weight to each source of pronunciation difficulty, the weight representing a measure of severity of the source of pronunciation difficulty;
- calculating using a processor a phonetic difficulty score, wherein calculating the phonetic difficulty score comprises calculating a product of a number of times the phonetic source occurs in an utterance of the non-native speaker and the weight of the phonetic source;
- calculating using the processor a language model score based on a sound comparison between the language of the non-native speaker and the second language, wherein the language model score is calculated based on a difference between a cross-entropy of the utterance with respect to a language model of the language of the non-native speaker and a cross-entropy of the utterance with respect to a language model of the second language;
- normalizing using the processor the phonetic difficulty score and the language model score; and
- calculating and outputting a metric from the normalized phonetic difficulty score and the normalized language model score, the metric providing an assessment of pronunciation difficulty.

22. The non-transitory medium of claim 21, wherein the phonetic difficulty score is calculated using an equation:

$$\text{Score}_{phonetic\ difficulty} = \sum_{\forall t} \text{Count}(t, u) \cdot W(t),$$

where $\text{Score}_{phonetic\ difficulty}$ is the phonetic difficulty score, t is the phonetic source, u is the utterance, W(t) is the weight of the phonetic source, and Count(t, u) is the number of times the phonetic source occurs in the utterance of the non-native speaker.

23. The non-transitory medium of claim 21, wherein calculating the language model score comprises calculating a language model for the language of the non-native speaker and the second language.

24. The non-transitory medium of claim 23, wherein calculating a language model for the language of the non-native speaker and the second language comprises phonetically transcribing the first language of non-native speaker and the second language.

25. The non-transitory medium of claim 21, wherein normalizing the phonetic difficulty score and the language model score comprises determining a normalized phonetic difficulty score and a normalized language model score such that the mean of the normalized phonetic difficulty score is equal to the mean of the normalized language model score and the standard deviation of the normalized phonetic difficulty score is equal to the standard deviation of the normalized language model score.

26. The non-transitory medium of claim 21, wherein calculating the metric comprises calculating the sum of the normalized phonetic difficulty score and the normalized language model score.

27. The non-transitory medium of claim 21, wherein the multiple types of sounds in the second language that cause pronunciation difficulties include:
- a first sound that does not contrast with a second sound in the language of the non-native speaker; and
- a third sound that does not exist in language of the non-native speaker.

28. The non-transitory medium of claim 27, wherein the language of the non-native speaker is Japanese, the second language is English, the first sound is /r/, the second sound is /l/, and the third sound is /θ/.

29. The non-transitory medium of claim 21, wherein the steps further comprise:
- calculating using the processor the language model score based on the sound comparison between the language of the non-native speaker and the second language, including calculating a language model for the language of the non-native speaker and the second language and calculating a cross-entropy of an utterance with respect to the language model of the language of the non-native speaker inversely weighted by the cross-entropy of the utterance with respect to the language model of the second language.

30. The non-transitory medium of claim 29, wherein calculating the cross-entropy of an utterance with respect to the language model of the language of the non-native speaker comprises assigning a lower score to utterances of the second language that are similar to sounds of the language of the non-native speaker, and assigning a higher score to utterances of the second language that are not similar to sounds of the language of the non-native speaker.

* * * * *